Oct. 6, 1959 L. A. LINDBLAD 2,907,100
METHOD OF MANUFACTURING ELECTRIC IGNITERS
AND AN ELECTRIC IGNITER MADE
BY SAID METHOD
Filed Sept. 22, 1955 4 Sheets-Sheet 1

INVENTOR
LARS ALFRED LINDBLAD
BY Hearne and Nydick
ATTORNEYS

Oct. 6, 1959 L. A. LINDBLAD 2,907,100
METHOD OF MANUFACTURING ELECTRIC IGNITERS
AND AN ELECTRIC IGNITER MADE
BY SAID METHOD
Filed Sept. 22, 1955 4 Sheets-Sheet 2

INVENTOR
LARS ALFRED LINDBLAD
By Howe and Nydick
ATTORNEYS

Oct. 6, 1959 L. A. LINDBLAD 2,907,100
METHOD OF MANUFACTURING ELECTRIC IGNITERS
AND AN ELECTRIC IGNITER MADE
BY SAID METHOD
Filed Sept. 22, 1955 4 Sheets-Sheet 4

INVENTOR
LARS ALFRED LINDBLAD

BY Haue and Nydick
ATTORNEY

2,907,100
METHOD OF MANUFACTURING ELECTRIC IGNITERS AND AN ELECTRIC IGNITER MADE BY SAID METHOD

Lars Alfred Lindblad, Grondal, Sweden, assignor to Aktiebolaget Bofors, Bofors, Sweden, a corporation of Sweden Application September 22, 1955, Serial No. 535,944

Claims priority, application Sweden October 11, 1954

3 Claims. (Cl. 29—155.5)

The present invention relates to a method of manufacturing electric igniters or primers, especially igniters used in conjunction with fuses for ammunition and to igniters or primers made by the method of the invention. More particularly, the invention relates to electric igniters of the kind comprising two conductors two juxtaposed ends of which are embedded in an insulation body ending flush with the surface of the body and electrically joined by a layer of conducting material adhered to the surface of the insulation body.

It is known to manufacture electric igniters of the general kind above referred to, by embedding juxtaposed ends of the two conductors in an insulation body such as a glass bead in which the conductors are so positioned that their end faces are laid bare on the surface of the bead. The conductors are then electrically joined by applying a conductive coating to the surface of the bead for instance, by plating.

Igniters, especially igniters for fuses for ammunition, require on one hand that the bared ends of the conductors are positioned at a certain distance from each other. On the other hand it is desirable that the conductor ends are as close to each other as possible. The positioning of the conductors has been heretofore achieved by spacing the conductors before embedding the same in the beads. Such spacing involves a rather complicated procedure in view of the smallness of the components. Furthermore, the conductors tend to come into direct contact with each other. To avoid an electric contact between the conductors at points other than through the aforesaid conductive layer it has been proposed to cover both or one of the conductors with an insulating coating. However, it has been found that the high temperature involved in the casting operation, especially when glass is used, tends to destroy the insulating coating. As a result, it has been necessary to enlarge the spacing of the conductors beyond the required minimum distance which is undesirable in view of the operational demands made on the igniters. It is further desirable to employ a minimum energy to heat the conductive coating to the ignition temperature.

Accordingly, one of the objects of the present invention is to provide a novel and improved method of manufacturing electric igniters of the general kind above referred to which permits a spacing of the conductor ends considerably narrower than heretofore obtainable without danger of direct contact between the conductors.

Another object of the invention is to provide a novel and improved method of manufacturing electric igniters which eliminates the heretofore necessary tedious positioning of the conductors prior to embedding the same in the insulation material. The method of the invention permits to place the conductors side by side without causing electric contact between the same at points other than at the ends through the conductive layer.

Still another object of the invention is to provide a novel and improved method of manufacturing electric igniters which permits embedding of the conductor ends in the insulation material and electrically joining the ends without employing the heretofore required high temperatures often destructive to the insulation coating of the conductors.

A further object of the invention is a novel and improved method of manufacturing electric igniters which lends itself to mass production operations and produces igniters of high uniformity.

A still further object of the invention is to provide a novel and improved method of manufacturing electric igniters which materially reduces the energy required to heat the conductive coating to the ignition temperature by employing a minimum of conductive coating material for electrically connecting the two conductors.

Another object of the invention is a novel and improved electric igniter in which the conductors are disposed at a minimum spacing without danger of coming in electric contact with each other except at the ends and which require a minimum of energy for heating to the ignition temperature.

Other and further objects, features and advantages of the invention will be pointed out hereinafter and set forth in the appended claims.

In the accompanying drawings several preferred embodiments of the invention are shown by way of illustration and not by way of limitation.

In the drawings:

Fig. 1b shows a modification of the completed igniter of Fig. 1a;

Figure 1A:
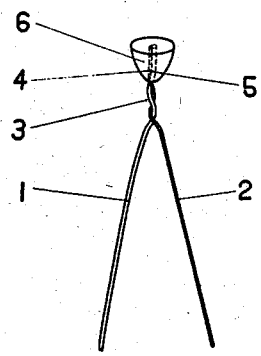
Fig. 1a shows a completed igniter.

Referring first to Fig. 1a, this figure shows an igniter comprising two electric conductors 1 and 2. Conductor 1 is coated with insulation material and conductor 2 is left bare. The conductors are partly joined by twisting two juxtaposed ends thereof. The end parts of the conductors above the twisted portion 3 are designated by 4 and 5 and are placed as close to each other as possible, preferably so that the spacing between the conductor parts 4 and 5 does not exceed the thickness of the insulating coating on conductor 1. The conductor ends are embedded in a body 6 which has preferably semi-spherical shape and consists of insulating material. The material of body 6 is advantageously of a kind such that the embedding of the conductor ends therein does not require a temperature high enough to destroy the insulating coating of conductor 1. Insulating materials suitable for the purpose are for instance, hardening synthetic resins of epoxy type. The end faces of conductors 1 and 2 are bare and substantially flush with the plane surface of body 6.

As is apparent, the spacing between conductor ends 4 and 5 may be in excess of the distance corresponding to the thickness of the coating on conductor 1, but still be less than the distance that has been previously obtainable when the insulating body consists of glass. It is further apparent that body 6 may have a variety of suitable shapes other than a semi-spherical shape, provided only that the conductor ends 4 and 5 are laid bare at the outer surface of the body.

Figure 1B:
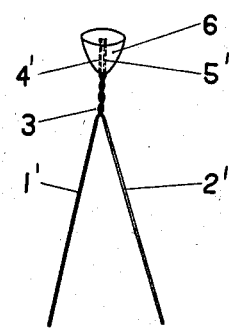

The igniter shown in Fig. 1b differs from the igniter just described only in that both the conductors 1' and 2' are coated with insulation material and that also the end parts 4' and 5' are coated.

Referring now to Figs. 2 through 7a and describing the method of manufacturing igniters according to Fig. 1 in connection therewith.

Figure 2:
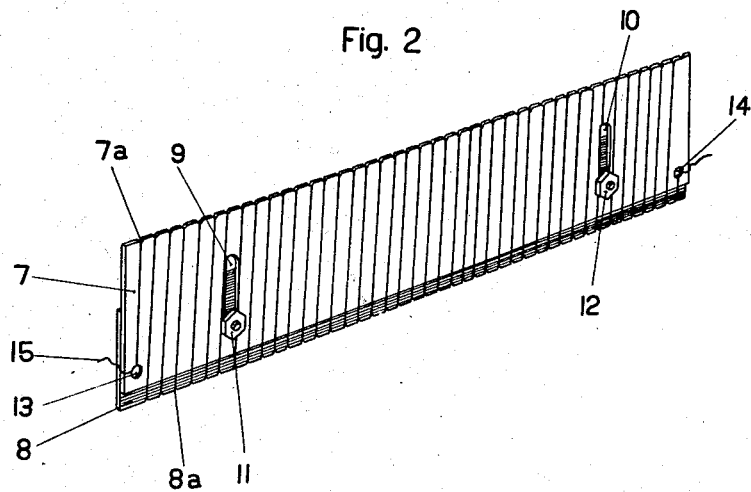
Figs. 2 to 7 show successive operational stages in the manufacture of igniters according to Fig. 1.

Fig. 2 shows two preferably rectangular plates 7 and 8. Plate 7 has notches 7a along one of its long edges and similarly plate 8 has notches 8a along its long edge distant from the notched edge of plate 7. Plate 8 is further provided with two transverse elongated slots 9 and 10 through which penetrate screws 11 and 12 threaded in plate 8. By displacing plates 7 and 8 relative to each other, the width of the peripheral outline of the unit formed by plates 7 and 8 can be adjusted, screws 11 and 12 serving to fix the plates in the adjusted position.

As the first step of manufacture plates 7 and 8 are so set that plate 8 protrudes beyond plate 7 as shown in Fig. 2. Thereupon an insulated electric conductor 15 is spirally wound about plates 7 and 8 by fitting the conductor in the respective notches 7a and 8a. The beginning and the end of the conductor are fastened in holes 13 and 14 respectively, provided in plate 7 and if desired in plate 8 also.

After winding of the conductor, set screws 11 and 12 are loosened and plates 7 and 8 are slid into a position such that the notched edge of plate 8 is in registry with the smooth edge of plate 7.

Figure 3:
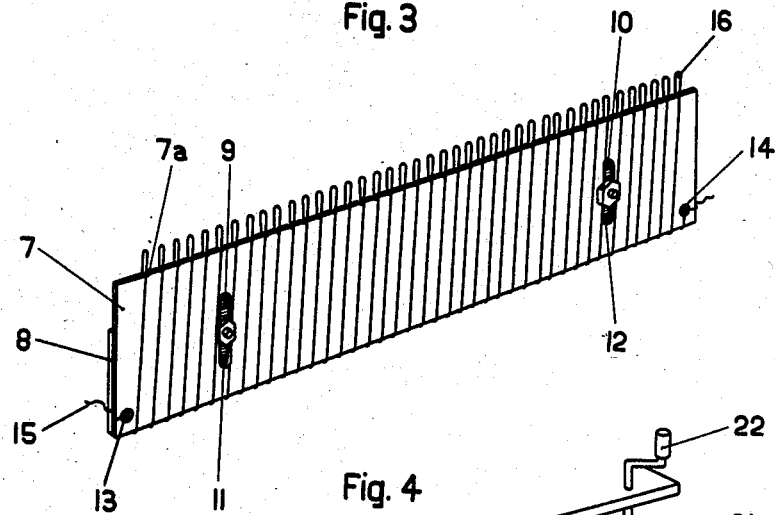
Figure 4:
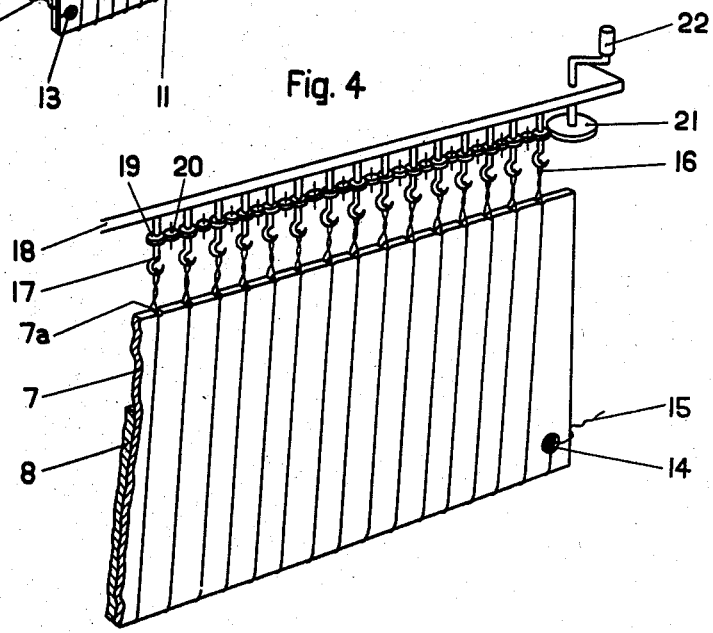
Figure 5:
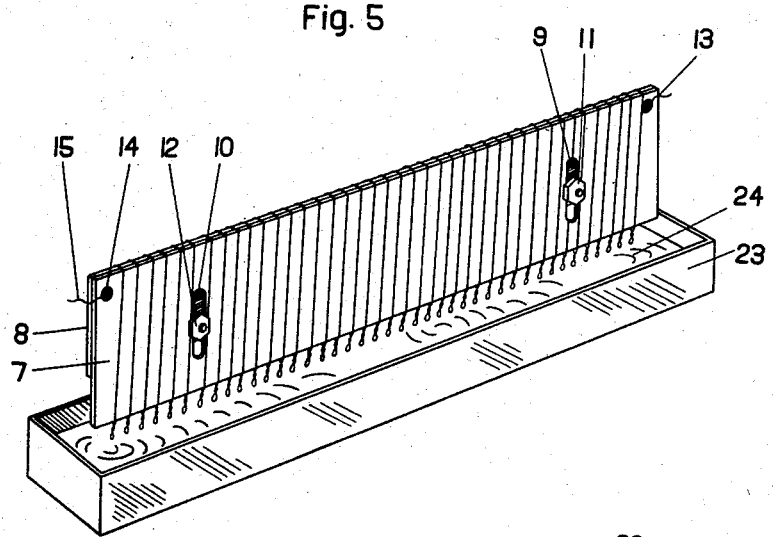

As a result, a number of loops 16 corresponding to the number of windings of conductor 15 protrude from the notched edge of plate 7 as shown in Fig. 3.

The next step is to twist the protruding loops 16. This can be effected individually by hand but is more efficiently performed by an implement of the design shown in Fig. 4. The wire winding device according to this figure comprises a bar or plate 18 from which depend a suitable number of rotatably mounted hooks 17. Each one of the aforementioned loops 16 is hooked over one of these hooks. Each hook seats a gear 19 which is coupled with the gear of the adjacent hook by an intermediate gear 20. The last gear is rotated by means of a gear 21 actuated by a crank 22. It is, of course, possible to employ a friction drive instead of a gear drive or any other suitable transmission means for imparting rotation to all the hooks.

Upon turning of crank 22 all the loops 16 are twisted by a corresponding number of turns. The top end of the loops or part of the twisted conductors also is cut off to obtain a twisted conductor portion 3 of the desired length. While the conductors are still on plates 7 and 8, the twisted portions of the conductors are dipped into a bath 24 of a suitable hardening insulation material contained in a vessel 23. The dipping operation is so conducted that generally spherical drops 25 are formed.

Figure 6:
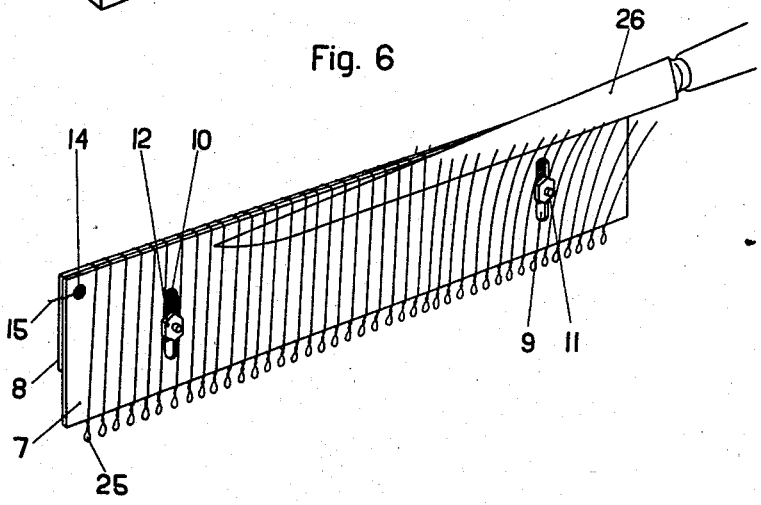

After completion of the dipping operation, the ends of the conductors opposite the twisted portions—which ends form the base of a U-shape—are cut by a suitable sharp instrument for instance, a knife 26 as shown in Fig. 6.

As a result semi-finished igniters are obtained corresponding in number to the number of spiral windings of the conductor on plates 7 and 8. Each igniter at this stage of completion comprises a twisted portion embedded in blob 25 of insulation material and two branches 15a and 15b. The branches 15a and 15b are placed in a device for joining the two conductors at their ends embedded in the insulating body 25 by a conductive layer.

Figures 7, 7A:
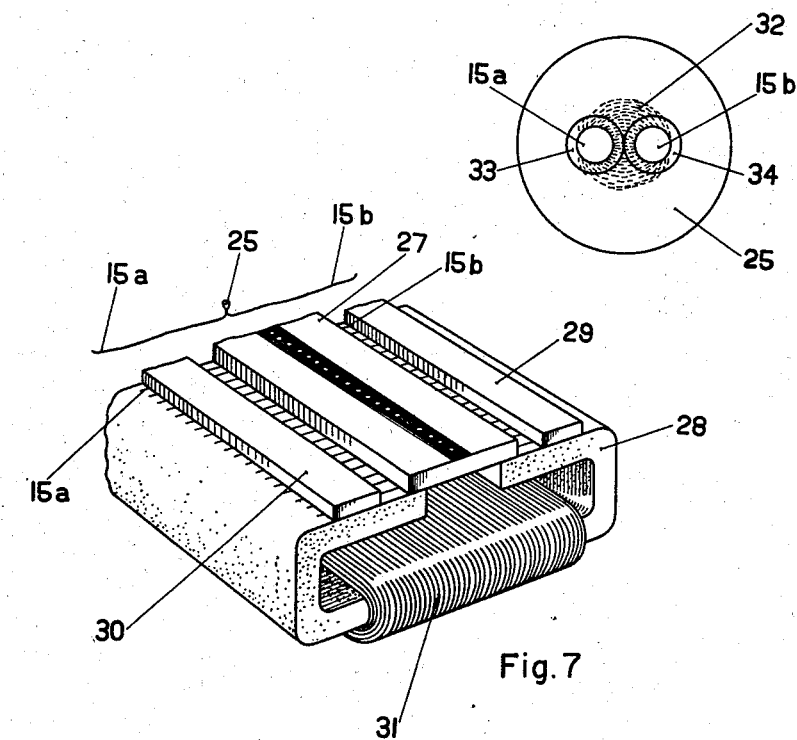
Fig. 7a is an enlarged partial view of Fig. 7.

This device which is shown in Figs. 7 and 7a, comprises a plate 27 made of insulation material and formed with a row of semi-spherical recesses each having a shape fitting about half the shape of the insulating bodies 25. A hole through the bottom of each recess permits to pass the conductor branches 15a and 15b therethrough. The semi-finished igniters are inserted in the recesses so that about one-half of each insulation body 25 protrudes from the upper surface of plate 27. The conductor parts protruding from the bottom of plate 27 are stretched out into the position shown in Fig. 7. The protruding portion of each body 25 is ground down flush with the upper surface of plate 27. As a result, conductor parts 15a and 15b are separated and the insulating bodies 25 attain the configuration shown for the insulating body 6 of Figs. 1a and 1b, the respective ends of conductor parts 15a and 15b being bare and flush with the plane surface of insulating bodies 25.

Plate 27 is thereupon placed upon a yoke 28 of an electromagnet forming part of the aforementioned device and the stretched out conductor parts 15a and 15b are held in position by metal plates 29 and 30 placed upon the conductor parts protruding from plate 27. The coil of the electromagnet is designated by 31 and should be visualized as being connectable to a suitable source of power.

The insulating bodies 25 fitted in the recesses of plate 27 are thereupon coated with a hardening adhesive liquid containing discrete particles 32 of an eletrically conducting and magnetizable material.

The energizing current for coil 31 is now closed and the resulting magnetic field surrounding the insulating bodies 25 will orient the magnetizable particles in accordance with well known magnetic laws along flux lines extending from one conductor 15a to the other conductor 15b as is shown in Fig. 7a in which the insulating coatings of the conductors are designated by 33 and 34, the conductors being made of magnetizable material.

The orientation of the magnetizable particles by a magnetic field affords the important advantage that a minimum of electrically conducting material may be used to form a conducting bridge between the bared ends of conductors 15a and 15b. As is apparent, use of a minimum of conducting material to form the bridge entails that a minimum of current is required to heat the coating when the igniter is activated to set off an explosive charge.

The igniter has now reached the stage shown in Fig. 1a of Fig. 1b. To ready the igniter for actual use the plane surface of each semi-spherical insulation body 25 is coated with a suitable ignitable explosive such as acetylene silver.

Experience and tests have shown that finished igniters mass produced by the invention are so uniform that existing differences are negligible.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A method of manufacturing electric igniters, comprising the steps of spirally winding an insulated wire conductor about a generally rectangular carrier adjustable in width, adjusting the width of the carrier relative to the conductor wound thereupon so as to form loops of conductor wire protruding from one edge of the carrier, twisting each of said loops, cutting the closed end of each twisted loop, embedding the twisted and cut wire ends in a body of hardening insulating material, cutting the conductor wire to form a plurality of units each including two wire sections twisted together along one end and embedded in said insulating body at said twisted ends, cutting through each insulating body and the twisted wire ends embedded in said body in a plane substantially transverse of the longitudinal axes of said wire ends to lay bare the ends of the respective wire sections in a plane substantially flush with the outer surface of the insulating body, and applying to said insulation body a conductive coating forming a bridge between said bared wire ends.

2. A method according to claim 1, wherein said conductor wire is cut along the edge of said carrier opposite to the edge from which said loops protrude.

3. A method of manufacturing igniters, comprising the steps of spirally winding an insulated wire conductor about a generally rectangular carrier adjustable in width, adjusting the width of the carrier relative to the conductor wound thereupon so as to form loops of conductor wire protruding from one edge of the carrier, twisting each of said loops, cutting the closed end of each twisted loop, embedding the twisted and cut wire ends in a body of hardening insulating material, cutting the conductor wire to form a plurality of units each including two wire sections twisted together along one end and embedded in said insulating body at said twisted ends, cutting through each insulating body and the twisted wire ends embedded in said body in a plane substantially transverse of the longitudinal axes of said wire ends to lay bare the ends of the wire sections in a plane substantially flush with the cut surface of the insulating body, applying to the surface of each insulating body including the bared wire ends a layer of a mixture containing electrically conductive and magnetizable discrete particles and a hardening binder, and subjecting each of said layers, prior to the hardening thereof, to a magnetic field orienting said particles to form a conductive bridge between the bared wire ends.

References Cited in the file of this patent

UNITED STATES PATENTS

| | | |
|---|---|---|
| 359,205 | Curtis et al. | Mar. 8, 1887 |
| 374,640 | Sundstrom | Dec. 13, 1887 |
| 938,553 | Cahuc | Nov. 2, 1909 |
| 1,045,994 | Madson et al. | Dec. 3, 1912 |
| 1,186,781 | Henry | June 13, 1916 |
| 1,449,369 | Anderson | Mar. 27, 1923 |
| 2,288,862 | Weitmann et al. | July 7, 1942 |
| 2,360,608 | Kauffman et al. | Oct. 17, 1944 |
| 2,391,222 | Blattner | Dec. 18, 1945 |
| 2,443,582 | Lendo et al. | June 15, 1948 |
| 2,687,667 | Gunther | Aug. 31, 1954 |
| 2,754,757 | MacLeod | July 17, 1956 |